Mar. 6, 1923.

W. E. HOLLAND ET AL.
METHOD OF MAKING STORAGE BATTERY GRIDS.
FILED OCT. 29, 1918.

Inventors,
Walter E. Holland,
James M. Skinner
by their Attorneys,
Howson & Howson Mar. 6, 1923.

W. E. HOLLAND ET AL.
METHOD OF MAKING STORAGE BATTERY GRIDS.
FILED OCT. 29, 1918.

Inventors,
Walter E. Holland,
James M. Skinner,
by their Attorneys.
Howson & Howson Mar. 6, 1923.

W. E. HOLLAND ET AL.
METHOD OF MAKING STORAGE BATTERY GRIDS.
FILED OCT. 29, 1918.

Inventors:
Walter E. Holland,
James M. Skinner,
by their Attorneys
Howson & Howson Patented Mar. 6, 1923.

1,447,781

UNITED STATES PATENT OFFICE.

WALTER E. HOLLAND AND JAMES M. SKINNER, OF PHILADELPHIA, PENNSYLVANIA, ASSIGNORS TO PHILADELPHIA STORAGE BATTERY COMPANY, OF PHILADELPHIA, PENNSYLVANIA, A CORPORATION OF PENNSYLVANIA.

METHOD OF MAKING STORAGE-BATTERY GRIDS.

Application filed October 29, 1918. Serial No. 260,193.

*To all whom it may concern:*

Be it known that we, WALTER E. HOLLAND and JAMES M. SKINNER, citizens of the United States, residing in Philadelphia, Pennsylvania, have invented the Method of Making Storage-Battery Grids, of which the following is a specification.

The supporting frames or grids of storage battery electrodes or plates are customarily made by casting a suitable lead alloy in a metal mold maintained by gas burners at such a temperature as will insure the flow of metal to all of its parts. These burners are necessarily so operated as to maintain the mold temperature at such a point that the molten metal will certainly flow to the parts of the mold most remote from the pouring gate as well as fill the channels having the smallest cross sectional area. The resulting frames or grids, owing to conditions inherent in this method of manufacture, are of a non-uniform structure, are more or less porous, and vary in density and strength at different points. Because of this porous, non-uniform structure, the grids are attacked under conditions of use, the metal being oxidized not only on its outer surfaces but also internally, due to penetration of the electrolyte into the pores. As a consequence, in a relatively short time the integrity of the grid is seriously impaired and the useful life of the plate, of which the grid is the foundation, is shortened. Moreover, owing to the unequal stresses resulting from this internal oxidation of the porous, non-uniform metal, the grids and consequently the plates made from them, are found to buckle or become otherwise distorted, causing the plates to short-circuit and become inoperative in a relatively short time.

One object, therefore, of the present invention is to provide a method of making grids, particularly those composed of lead alloys designed for use in storage battery plates, which shall be of relatively high density, practically free from pores, and of uniform texture and structure throughout, with a view to preventing the internal oxidation with consequent disintegration, uneven action and buckling, which has hitherto occurred to a greater or less degree in grids as at present made and used.

Another object of the invention is to provide a method of making grids for storage battery plates which may be of less thickness and lighter weight than it has been found practicable to make them by the usual casting methods.

Another object of the invention is to provide a method of making grids for storage battery plates from lead alloy containing a decreased percentage of hardening metal, such as antimony, the necessary hardening being effected mechanically by the process of working, thus decreasing brittleness without sacrificing strength, and thus also reducing the cost.

Another object of the invention is to provide a method of making storage battery grids which, by virtue of being filled out sharply and smoothly all over, will take the active paste uniformly at all points, with the result that the faces of the finished plate are smooth and perfectly flat,—such a plate having the advantage that when assembled with the usual flat perforated or slotted separators, the active material will be better held in place and the plate life lengthened due to the improved surface contact of plate and separators. Furthermore, due to the elimination of surface hollows, such a plate will obviously contain more active material for a given overall thickness.

It is further desired to provide an inexpensive and easily performed method of making storage battery grids, uniformly having the above qualities.

These objects and other advantageous ends we attain as hereinafter set forth, reference being had to the accompanying drawings, in which, Figs. 1 and 2 are vertical sections of dies that may be used in carrying out our improved method;

Figure 5:
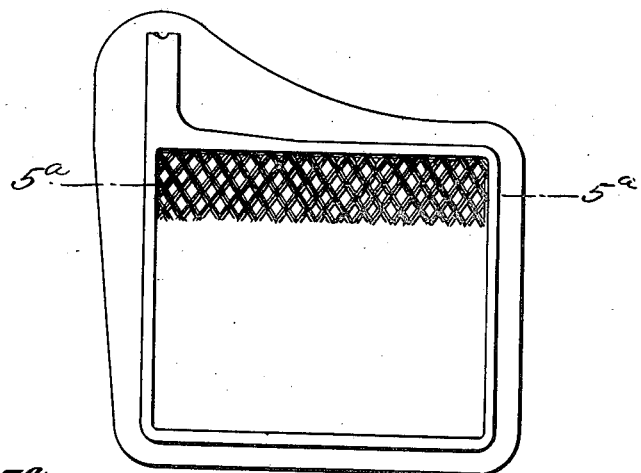
Fig. 5 is an elevation after striking up or coining the members of a grid from the blank shown in Fig. 4.
Figure 5:
Figure 6:
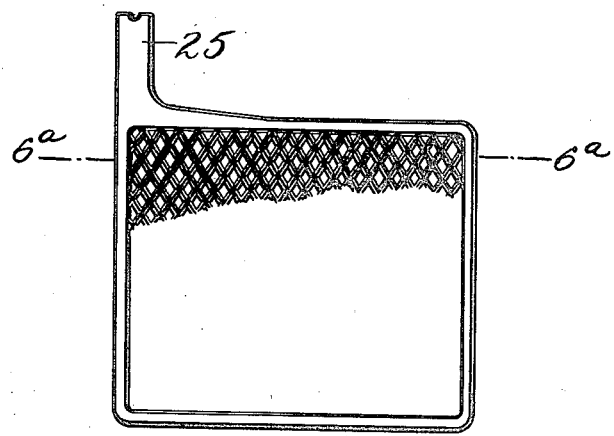
Figure 7:
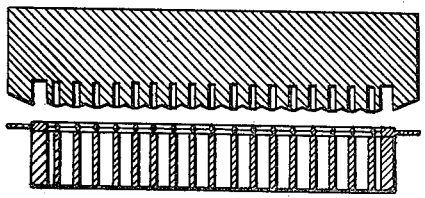
Figure 7:
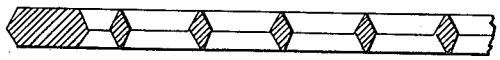
Figure 8:

Fig. 5$^a$ is an enlarged fragmentary, transverse, vertical section on the line 5$^a$—5$^a$, Fig. 5;

Fig. 6 is an elevation of a finished grid after punching out the fins between members and cutting away the marginal web;

Fig. 6ª is an enlarged, fragmentary, transverse, vertical section on the line 6ª—6ª, Fig. 6;

Fig. 7 is a vertical section of a punching die that may be used to remove the fins and marginal web, and Fig. 8 is a fragmentary, vertical section of a form of blank which we may use under certain conditions.

In carrying out our invention we use as stock from which to form grids, any suitable metal or alloy, preferably an alloy of lead, in the form of rolled sheet, the thickness of sheet being determined by the design and thickness of the finished grid. As an example, in making a grid .062" thick of a certain design, we should start with sheet .025" thick.

Figure 1:
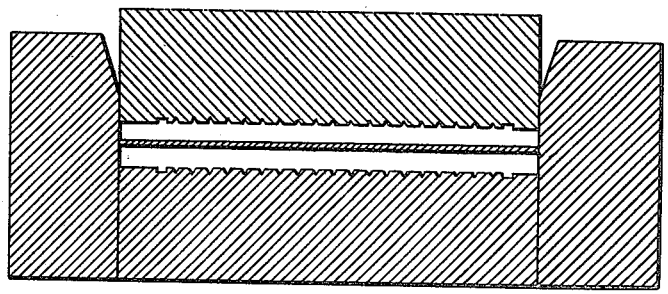
Figure 2:
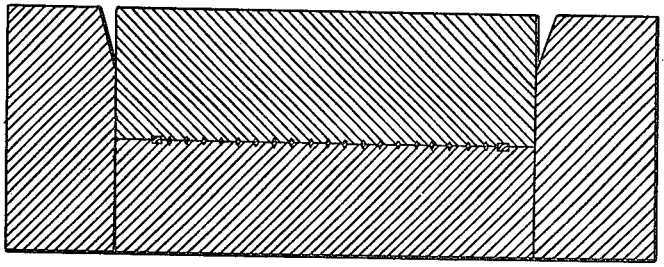
Figure 3:
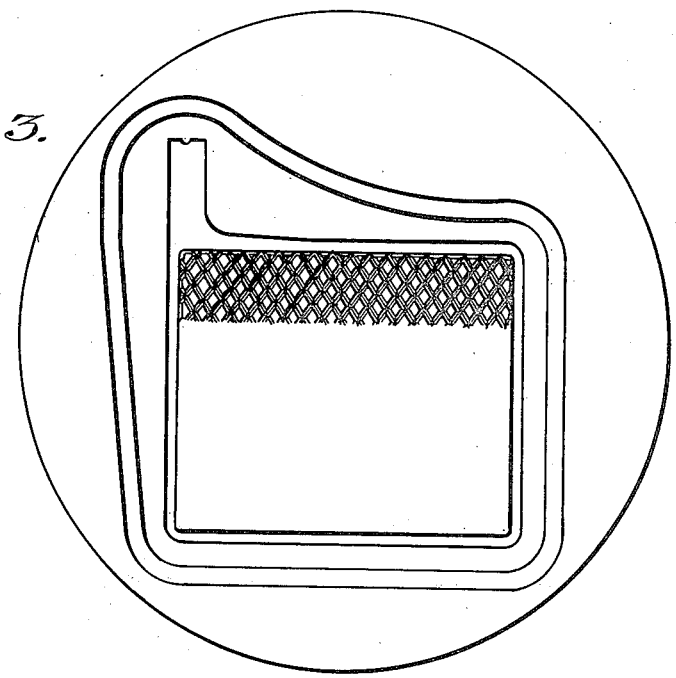
Fig. 3 is a plan of one die and the surrounding collar within which the dies operate.
Figure 4:
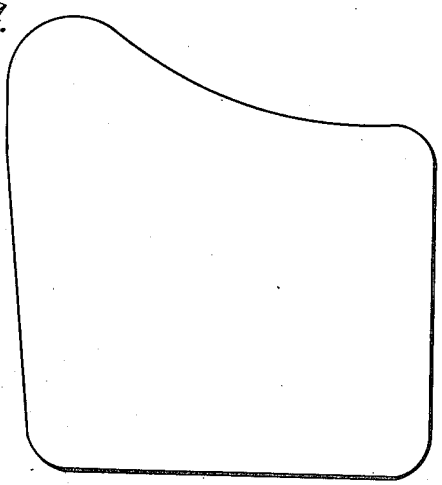
Fig. 4 is an elevation of a blank of sheet metal from which a grid may be formed according to our method.

In the first operation a sheet is fed to a small punch press fitted with simple cutting dies, to punch out the blanks shown in Fig. 4. Each blank is then placed between dies, such as shown in Figs. 1, 2 and 3, which are mounted in any suitable form of slow-acting, relatively powerful press, preferably of the hydraulic type. In this press the blank is given a relatively heavy pressure to strike up or coin the grid members, and this pressure is preferably continued after flow of metal has ceased, to render its texture uniform throughout and increase its density above the normal. The dies may be heated by electrical means, or otherwise, it having been found that considerably less pressure is required with dies heated to somewhat less than the melting point of the sheet metal, so as to soften and facilitate the flow of the same. It has been found impracticable to bring the dies together with such pressure that the metal is entirely squeezed from between the members and from the margin outside of the frame, so that after the coining operation a thin fin, perhaps .01" thick, remains at these points, as shown in Figs. 5 and 5ª. It is usually desirable to remove wholly or partially, or to perforate the fins between the members and it is always desirable to remove the marginal fin from around the outside of the frame. This may be done with punching or cutting dies, as shown in Fig. 7. The formed blank is placed between these dies, operating for instance in a small punch press, and this is operated to perforate without removing or to cut out all or such part of the fins as it is thought desirable to remove.

One design of grid made by the above method appears, when completed, as shown in Figs. 6 and 6ª, but other designs of grid may be made equally well by the same method.

The thin fins may be removed from the formed blank in other ways than by cutting with dies as described as, for example, by treatment in a suitable chemical solvent capable of dissolving the metal either with or without the application of electric current.

Another method is to place the formed blank on a grating similar to the female member of the punching die, Fig. 7, or between two such gratings, to shield the grid members while subjecting the fins to a quick blast of flame just sufficient to melt away the thin metal. Again, if desired, such fins may be removed by means of a sand blast, which, under certain conditions, would be advantageous, as in addition to removing the fins it would slightly roughen the surface of the rib and frame members of the grid in such manner that the adhesion to the grid of the active paste subsequently applied would be improved.

In the formation of certain types of grid, especially those of relatively great thickness, it may be advisable, in order to provide the presence of sufficient metal in the surrounding or supporting frame, that the blank from which the grid is to be made be given a preliminary treatment to turn over its edges or partially strike up the marginal portions as shown in Fig. 8 or otherwise to thicken the marginal frame and projecting lug 25. Such partially formed blank is thereafter fully formed or coined between dies, as shown in Figs. 1, 2 and 3, and is thereafter handled in accordance with the method described above.

Owing to the nature of the metal used, and especially to the fact that it will flow and weld under pressure, the structure of the grid made by our improved method is rendered uniformly dense at all points, so that when it is incorporated in a storage battery plate and subjected to conditions of use, the electrolyte cannot penetrate into its body and the oxidation preceeds evenly, on the surface of the metal only. As a result, the grid retains its strength and conductivity, has a longer useful life, and is not subjected to internal stresses. Furthermore, this mechanical method of making grids, by overcoming the limitations inherent in present casting methods, makes possible and practicable the manufacture of thinner and lighter grids than have heretofore been made and used, the grids being filled out sharply and smoothly at all points as well as uniformly strong, and of compact and homogeneous structure or texture, by virtue of which under conditions of use they are correspondingly free from internal oxidation and consequent distorting stresses and disintegrating action. The plates embodying such grids are of uniform thickness, with smooth flat faces, and have a materially longer useful life than has hitherto been obtainable.

We claim:

1. The method of making storage battery grids which consists in subjecting a sheet of metal to pressure and thereby causing it to flow into the recesses of a mold, and thereafter continuing such pressure to render its texture uniform throughout and increase its density above the normal.

2. The method of making storage battery grids which consists in subjecting the sheet of metal to pressure sufficient to cause certain of its portions to be completely displaced to form openings and others of its parts to form body and frame members of uniform density.

3. The method of making a storage battery grid which consists in subjecting suitable material to pressure and heat to form therefrom a grid.

4. The method of making a storage battery grid which consists in acting on sheet metal to form a blank; and subjecting such blank to relatively heavy pressure and heat to form therefrom a grid.

5. The method of making a storage battery grid which consists in subjecting a sheet of metal to relatively heavy pressure to form intersecting rib and frame members of compressed metal; and subjecting the fins of metal also formed to a relatively intense heat to remove the same.

6. The method of making storage battery grids which consists in subjecting a sheet of metal to pressure between molds so designed that certain of its portions are caused to flow outwardly while other of its portions are caused to flow inwardly, to form a grid of compressed metal.

7. The method which consists in compressing a body of sheet metal to cause marginal portions thereof to flow inwardly to form or assist in forming the relatively heavy frame members of a ribbed grid.

In witness whereof we affix our signtures.

WALTER E. HOLLAND.
JAMES M. SKINNER.